April 27, 1937.　　　A. BOOR　　　2,078,367

SWAY BAR CONSTRUCTION

Filed Jan. 8, 1936　　　2 Sheets-Sheet 1

INVENTOR
ARTHUR BOOR
BY
ATTORNEYS

April 27, 1937.  A. BOOR  2,078,367
SWAY BAR CONSTRUCTION
Filed Jan. 8, 1936  2 Sheets-Sheet 2
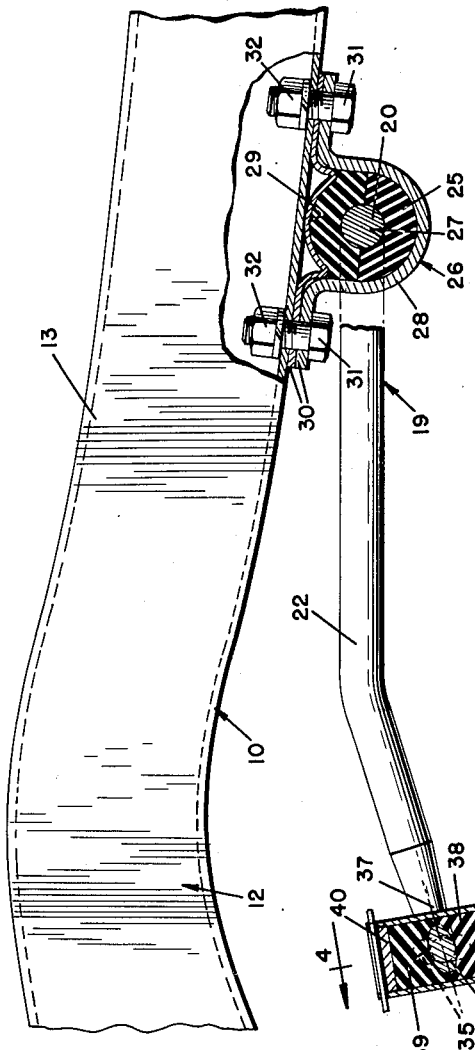
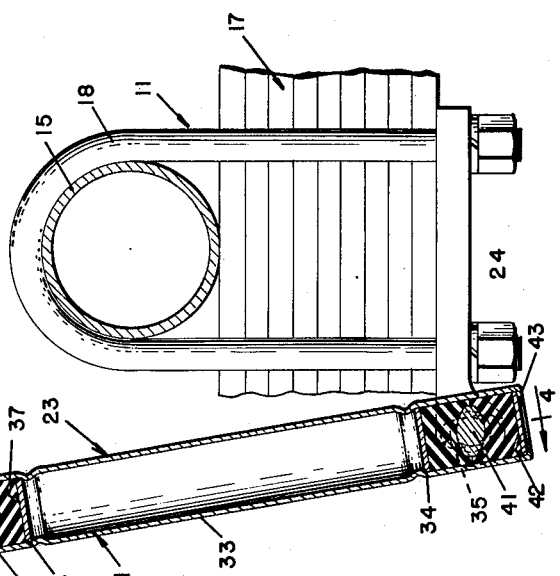
INVENTOR
ARTHUR BOOR.
BY
ATTORNEYS Patented Apr. 27, 1937

2,078,367

UNITED STATES PATENT OFFICE 2,078,367

SWAY BAR CONSTRUCTION

Arthur Boor, Toledo, Ohio, assignor to Monroe Auto Equipment Company, Monroe, Mich., a corporation of Michigan Application January 8, 1936, Serial No. 58,187

5 Claims. (Cl. 267—11)

This invention relates generally to vehicles and refers more particularly to improvements in stabilizing equipment for vehicles.

The present invention concerns itself more specifically with stabilizers of the bar type mounted on the vehicle in such a manner that when one side of the vehicle rises at a different rate than the other, the stabilizer reacts with a twisting action keeping the vehicle body on an even keel and thereby prevents body roll or side sway.

One of the principal objects of this invention consists in improving generally, stabilizers of the foregoing character by simplifying the construction thereof and by insulating the bar, as well as its connections, from metallic contact with either the sprung or unsprung assembly.

Another advantageous feature of the present invention consists in mounting the sway bar in rubber on either the sprung or unsprung assembly, in such a manner that the rubber mounting exerts a radial pressure upon the sway bar to dampen the action of the latter with a resistance increasing as the degree of rotation of the bar increases. In other words, the mounting for the sway bar acts in a manner similar to a shock absorber to dampen the action of the usual suspension springs.

A further object of the present invention resides in the novel connection between the ends of the bar and the sprung or unsprung assembly of the vehicle, depending upon which of the latter assemblies the bar is mounted.

The foregoing, as well as other objects, will be made more apparent as this description proceeds, especially when considered in connection with the accompanying drawings, wherein:

Figure 3 is a fragmentary side elevational view of the construction shown in Figure 2, having certain parts broken away for the sake of clearness; and Figure 4 is a sectional view taken substantially on the plane indicated by the line 4—4 of Figure 3.

Figure 1:
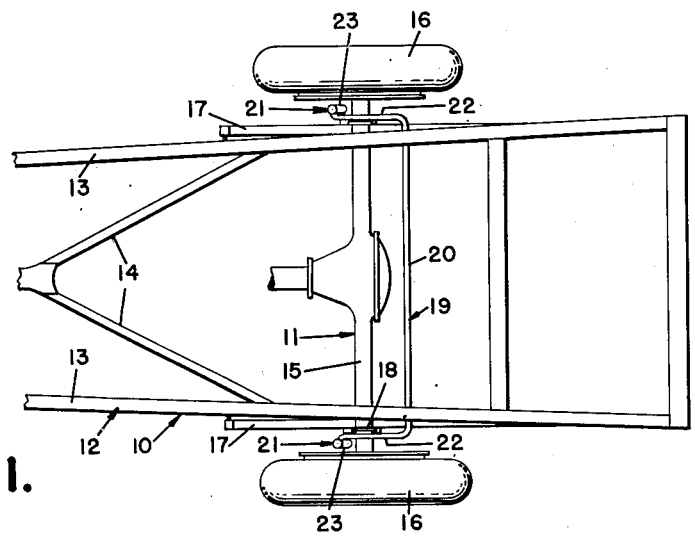
Figure 1 is a fragmentary plan view of a vehicle equipped with a stabilizer constructed in accordance with this invention.

Referring now to the drawings, it will be noted that there is illustrated in Figure 1, a portion of a vehicle having a sprung assembly 10 and having an unsprung assembly 11. The sprung assembly 10 comprises a frame 12 having laterally spaced longitudinally extending side sills 13 secured in assembled relation by suitable cross members, designated generally herein by the reference character 14. The unsprung assembly 11 comprises an axle 15 extending transversely of the frame 12 beneath the latter and carrying road engaging wheels 16 at opposite ends thereof. In the present instance, the sprung assembly 10 is supported from the unsprung assembly 11 by means of semi-elliptical leaf springs 17 extending longitudinally of the frame 12 at opposite sides thereof and having the free end portions suitably connected to the adjacent sill members 13 of the frame. As shown particularly in Figure 3, the central portions of the leaf springs are secured to the axle 15 by suitable U-bolts 18.

Figure 2:
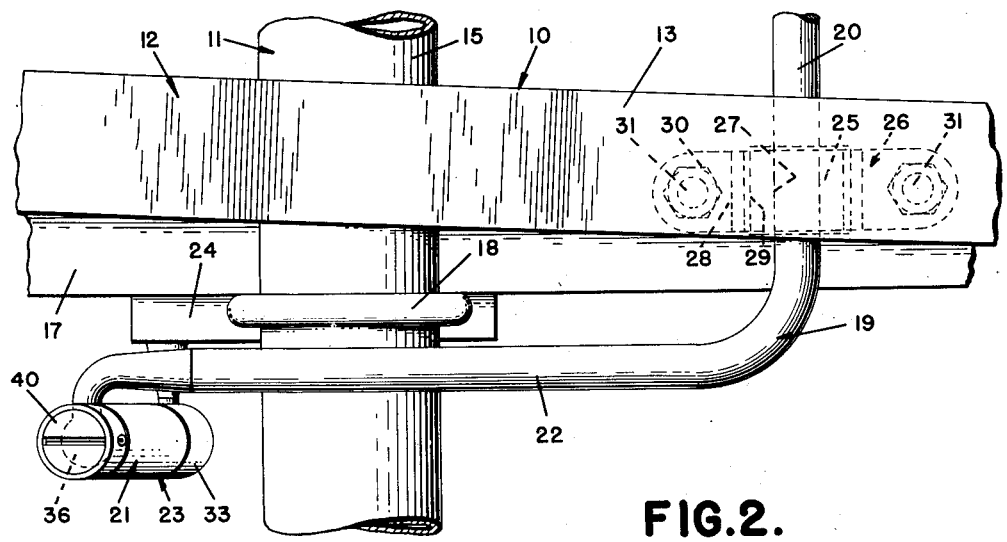
Figure 2 is an enlarged plan view of a portion of the vehicle shown in Figure 1.

In order to prevent side sway of the sprung weight assembly, or in other words, in order to maintain the latter assembly on an even keel, I provide means in the form of a stabilizer 19 comprising a spring steel bar 20 mounted upon one of the aforesaid assemblies and means 21 connecting the opposite ends of the bar to the other of the assemblies. Although it is immaterial, insofar as the principles of operation of the stabilizer are concerned, which of the assemblies is selected for mounting the bar 20, nevertheless, for the purpose of illustration, I have shown the bar 20 as extending transversely of the frame 12 and secured directly to the under side of the sills 13. Upon reference to Figure 2, it will be noted that the opposite ends of the bar 20 extend laterally beyond the sides of the frame 12 and terminate in longitudinally projecting extensions 22. The free ends of the extensions are connected to the axle by means of a link 23 having the upper ends secured to the free ends of the extensions 22 and having the lower ends secured to the brackets 24 which, in turn, are clamped to the underside of the springs 17 by means of the U-bolts 18.

With the construction thus far described, it will be noted that relative movement between the axle and frame at one side of the vehicle will be transmitted through the bar 20 tending to effect a similar relative movement between these parts on the opposite side of the vehicle. In other words, if one side of the vehicle rises at a different rate than the other, the stabilizer reacts with a twisting action of the bar 20 to keep the vehicle on an even keel so as to prevent what is commonly known in the trade as body roll or side sway.

It has been stated above that one of the principal features of the present invention consists in applying resistance to rotation of the bar 20 in such a manner that the degree of this resistance increases as the rotation of the bar increases.

This feature is desirable in that it renders it possible for the stabilizer to perform the additional function of dampening the action of the springs 17 through the bar 20 and is accomplished in the present instance by mounting the bar 20 in rubber in such a manner that the rubber exerts a radial pressure upon the bar sufficient to resist rotation of the same. As shown in Figure 3, a block of rubber 25 is secured to the underside of each of the sills 13 by means of a clamp 26 and the rubber blocks are formed with openings 27 therethrough for receiving the bar 20. Due to the U-shaped contour of the bar 20, assembly of the latter on the frame may be expedited by forming the blocks 25 of two complementary sections. In any event, however, the blocks 25 are held between clamps 26 under a slight compression and the openings 27 through the blocks are less in diameter than the diameter of the bar so that the latter will be frictionally engaged by the rubber. In other words, the bar is in effect, gripped by the rubber blocks and since the blocks are held in the clamps under compression, it necessarily follows that the degree of resistance to rotation of the bar will vary in accordance with the elasticity of the rubber and the extent of compression of the latter by the clamps.

In the present instance, each of the clamps 26 is composed of two sections 28 and 29. The two sections of the clamps cooperate to form a retainer for the rubber blocks 25 and the ends of these sections are extended laterally to provide attaching portions 30. The attaching portions are apertured for receiving the studs 31 and the latter are secured to the underside of the sills 13 by means of the nuts 32.

It will be apparent from the foregoing that the rubber blocks not only dampen the action of the springs 17 by resisting rotation of the bar 20, but they also serve to insulate the bar from metallic contact with the frame 12 and in order that the bar will also be insulated from metallic contact with the axle assembly, the following construction is provided. As shown particularly in Figure 4, it will be noted that the links 23 are provided with tubular body sections 33 restricted adjacent opposite ends thereof to form shoulders 34 and having openings 35 in the side walls thereof beyond the shoulders for receiving the spaded end portions 36 of the extensions 22. The openings 35 are elongated in the direction of the axis of the tubular sections 33 and have a width substantially less than the spaded ends 36 of the extensions. In this connection, it may be pointed out that the major axes 37 of the spaded portions 36 extend at substantially right angles to the major axes of the openings 35 in the assembled position of the bar 20 requiring the links to be rotated after the spaded portions are inserted through the openings so that the former extend transversely of the openings 35 when the links are in the position thereof shown in Figure 3. The arrangement is such as to prevent accidental disengagement of the links from the extensions 22 of the bar 20. Prior to inserting the spaded portions 36 into the upper ends of the tubular sections 33, the discs 37 are sleeved within the upper ends of the tubular sections for engagement with the shoulders 34 and the blocks 38 are telescoped within the latter ends of the tubular sections in seating engagement with the discs 37. The spaded portions 36 are then inserted through the openings 35 in the upper ends of the links and after the link has been rotated to the position thereof shown in Figure 3, cooperating rubber blocks 39 are sleeved within the upper extremities of the links and are secured in place by means of closure members 40 threaded into the upper extremities of the links. The rubber blocks are fashioned to entirely surround the spaded portions 36 of the extensions 22 and are held under compression within the links by means of the closures 40.

As previously stated, the lower ends of the links are secured to the brackets 24 and in the present instance, the brackets are also provided with spaded portions 41 similar to the spaded portions 36 and adapted to be extended through the elongated openings 35 in the lower ends of the tubular sections 33. In order to facilitate assembly, the brackets 24 are assembled with the lower ends of the links prior to securing the brackets to the unsprung assembly by the U-bolts 18 and the construction is such that when the brackets are in their operative positions shown in Figure 3, the major axes of the spaded portions 41 extend transversely of the openings 35. The spaded portions 41 on the brackets 24 are imbedded in rubber blocks in the same manner as the spaded portions 36, with the exception that the rubber blocks in the lower ends of the links are secured under compression by means of a disc 42 held in place by crimping the lower extremities of the tubular sections 33 as at 43.

It will be observed from the foregoing that although the links 23 are connected to the sprung and unsprung assemblies through the medium of rubber blocks, the latter are initially compressed in the assembly to such an extent that very little, if any, lost motion is present in the construction. In other words, the minimum movement of either end of the axle with respect to the frame will be transmitted directly to the sway bar so that the latter will function even though the extent of spring deflection is extremely slight. It will, of course, be understood that by reason of the foregoing construction, the sway bar, as well as the connections between the latter and axle, are insulated from metallic contact with either the frame assembly or the axle assembly. In addition, it will be noted that the rubber blocks 25 not only serve to connect the sway bar to the sprung assembly or frame 12, but also function to yieldably resist rotation of the bar to such an extent as to dampen the action of the suspension springs 17.

While in describing the present invention particular stress has been placed upon the association of the stabilizer with the sprung weight of a vehicle embodying semi-eliptical suspension springs, it is to be understood that the sway bar may be carried by the unsprung weight and that any of the numerous different types of spring suspension systems may be resorted to without interfering with the principles of operation of the sway bar previously described. Accordingly, reservation is made to make such changes in the details of construction that may come within the purview of the accompanying claims.

What I claim as my invention is:

1. In a vehicle having sprung and unsprung assemblies, a stabilizer comprising a bar mounted for rocking movement on one of the assemblies and having integral laterally projecting extensions at opposite ends thereof terminating in laterally extending enlarged head portions, means connecting the extremities of the extensions to the other of said assemblies including links having tubular portions apertured to receive the enlarged heads on the extremities of the extensions, and a yieldable material secured under compression within the tubular portions of the links on opposite sides of the head portions.

2. In a vehicle having sprung and unsprung assemblies, a stabilizer comprising a bar supported on one of the assemblies for rocking movement and having integral laterally projecting extensions at opposite ends thereof, means mounting the bar in rubber on the last named assembly, means connecting the extremities of the extensions to the other of said assemblies including links having tubular portions at opposite ends thereof containing a yieldable material, means fixed to the last mentioned assembly and imbedded within the yieldable material in the ends of the links adjacent the latter assembly, and enlarged heads on the extremities of the extensions of the bar imbedded within the yieldable material in the opposite tubular end portions of the links.

3. A sway bar and link assembly comprising, a torsion bar having integral laterally projecting extensions at opposite ends forming arms, elongated heads carried by the arms and extending laterally therefrom, links having hollow end portions and having openings through the hollow end portions for receiving the heads carried by the arms, and resilient inserts secured under compression within the hollow end portions of the links against opposite sides of said heads.

4. A sway bar and link assembly comprising, a torsion bar having integral arms extending laterally from opposite ends thereof and having elongated heads projecting from said arms at points spaced from the axis of the torsion bar, links having hollow end portions and having elongated openings through the hollow end portions, the long axes of the openings being sufficiently greater than the long axes of the heads to permit inserting the heads through said openings into the hollow portions of the links and the small axes of the openings being less than the long axes of the heads to prevent displacement of said heads from the hollow portions of the links upon positioning the long axes of the heads transverse to the long axes of the openings, and resilient members secured under compression within the hollow portions of said links against opposite sides of said heads.

5. A sway bar and link assembly comprising, a torsion bar having integral laterally projecting extensions at opposite ends forming arms, the free ends of the arms being bent laterally and provided with elongated heads, links having hollow end portions and having elongated openings through the hollow end portions, the long axes of the openings being sufficiently greater than the long axes of the heads to permit inserting the heads through said openings into the hollow portions of the links and the small axes of the openings being less than the long axes of the heads to prevent displacement of said heads from the hollow portions of the links upon positioning the heads with the long axes thereof transverse to the long axes of the openings, and rubber inserts secured under compression within the hollow portions of the links on opposite sides of the heads to secure the links to said sway bar.

ARTHUR BOOR.